United States Patent
Kerselaers

(10) Patent No.: US 10,819,024 B1
(45) Date of Patent: Oct. 27, 2020

(54) COMBINATION NEAR-FIELD AND FAR-FIELD ANTENNA

(71) Applicant: NXP B.V., Eindhoven (NL)

(72) Inventor: Anthony Kerselaers, Herselt (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/380,303

(22) Filed: Apr. 10, 2019

(51) Int. Cl.
*H01Q 1/36* (2006.01)
*H04R 1/10* (2006.01)
*H04B 5/02* (2006.01)

(52) U.S. Cl.
CPC .............. *H01Q 1/36* (2013.01); *H04B 5/02* (2013.01); *H04R 1/1016* (2013.01); *H04R 2420/07* (2013.01)

(58) Field of Classification Search
CPC ...... H04B 5/0025; H04B 5/0031; H04B 5/02; H04B 5/0081; H01Q 1/273; H01Q 7/08; H01Q 9/285; H01Q 1/36
See application file for complete search history.

(56) References Cited

U.S. PATENT DOCUMENTS

| | | | |
|---|---|---|---|
| 3,963,990 A | 6/1976 | DiFonzo | |
| 4,849,685 A | 7/1989 | Nave | |
| 5,017,878 A | 5/1991 | Nave | |
| 6,717,485 B2 | 4/2004 | Kolb et al. | |
| 7,742,614 B2 | 6/2010 | Christensen et al. | |
| 8,125,291 B2 | 2/2012 | Wang et al. | |
| 8,970,378 B2 | 3/2015 | Deavours et al. | |
| 9,106,328 B2 | 8/2015 | Kataoka et al. | |
| 9,197,986 B1 | 11/2015 | Kerselaers et al. | |
| 9,390,603 B2 | 7/2016 | Li et al. | |
| 9,577,348 B2 * | 2/2017 | Gomme | H04R 25/554 |
| 9,819,097 B2 * | 11/2017 | Kerselaers | H01Q 7/08 |
| 9,866,282 B2 | 1/2018 | Hirsch et al. | |
| 9,866,966 B2 | 1/2018 | Lott | |
| 9,941,981 B2 | 4/2018 | Linnartz | |
| 10,200,092 B1 | 2/2019 | Irci et al. | |

(Continued)

FOREIGN PATENT DOCUMENTS

EP 2458674 A2 5/2012
WO WO-2013/147823 A1 10/2013

OTHER PUBLICATIONS

Non Final Office Action; U.S. Appl. No. 16/150,015; 16 pages (dated Apr. 24, 2020).

(Continued)

*Primary Examiner* — Thuy Vinh Tran

(57) ABSTRACT

One example discloses a combination near-field and far-field antenna configured to be coupled to a conductive host surface, including: a first feed point configured to be coupled to a far-field transceiver; a second feed point configured to be coupled to a near-field transceiver; a first conductive antenna surface; a first filter having a first interface coupled to both the first feed point and the first conductive antenna surface, and having a second interface coupled to the second feed point; wherein the first filter is configured to attenuate far-field signals passing between the first conductive antenna surface and the far-field transceiver from being received by the near-field transceiver; and wherein the first filter is configured to pass near-field signals between the near-field transceiver and the first conductive antenna surface.

20 Claims, 5 Drawing Sheets

(56) References Cited

U.S. PATENT DOCUMENTS

| | | |
|---|---|---|
| 2010/0279734 A1 | 11/2010 | Karkinen et al. |
| 2010/0309080 A1* | 12/2010 | Minemura ............ H01Q 9/0407 343/788 |
| 2015/0249485 A1 | 9/2015 | Ouyang et al. |
| 2016/0029955 A1 | 2/2016 | Sato |
| 2017/0062913 A1 | 3/2017 | Hirsch et al. |
| 2017/0062949 A1 | 3/2017 | Kerselaers et al. |
| 2017/0324170 A1* | 11/2017 | Kerselaers ............ H04B 5/0031 |
| 2018/0241116 A1 | 8/2018 | Kerselaers et al. |
| 2019/0341678 A1* | 11/2019 | Gomme .................. H01Q 7/00 |
| 2020/0028246 A1 | 1/2020 | Kim |

OTHER PUBLICATIONS

U.S. Appl. No. 15/972,614; 29 Pages (filed May 7, 2018).

U.S. Appl. No. 16/150,015; not yet published; 30 pages (filed Oct. 2, 2018).

U.S. Appl. No. 16/504,562; not yet published; 36 pages (filed Jul. 8, 2019).

* cited by examiner

COMBINATION NEAR-FIELD AND FAR-FIELD ANTENNA

The present specification relates to systems, methods, apparatuses, devices, articles of manufacture and instructions for antennas.

SUMMARY

According to an example embodiment, a combination near-field and far-field antenna configured to be coupled to a conductive host surface, comprising: a first feed point configured to be coupled to a far-field transceiver; a second feed point configured to be coupled to a near-field transceiver; a first conductive antenna surface; a first filter having a first interface coupled to both the first feed point and the first conductive antenna surface, and having a second interface coupled to the second feed point; wherein the first filter is configured to attenuate far-field signals passing between the first conductive antenna surface and the far-field transceiver from being received by the near-field transceiver; and wherein the first filter is configured to pass near-field signals between the near-field transceiver and the first conductive antenna surface.

In another example embodiment, the first conductive antenna surface is a planar plate.

In another example embodiment, the first conductive antenna surface is either a planar spiral coil or non-planar helical coil.

In another example embodiment, the first conductive antenna surface is either a planar spiral or non-planar helical structure having a first end coupled to a set of electronic circuitry and a second end un-coupled and terminating in free-space.

In another example embodiment, the first conductive antenna surface is a monopole far-field antenna.

In another example embodiment, the monopole far-field antenna has a length greater than or equal to ¼ wavelength of the far-field signals carrier frequency.

In another example embodiment, the first conductive antenna surface is oriented such that far-field signal currents are substantially perpendicular to the conductive host surface.

In another example embodiment, further comprising a coil antenna portion coupled to the near-field transceiver and configured as a near-field magnetic antenna.

In another example embodiment, the near-field signals are about 50 MHz or less; and the far-field signals are about 1 GHz or more.

In another example embodiment, the first filter is an RF choke coil.

In another example embodiment, the first filter is at least one of: a ferrite bead, a coil with ferrite material around, or a parallel circuit tuned to RF frequency.

In another example embodiment, the first filter has either a low-pass filter topology or a notch filter topology.

In another example embodiment, the first filter (L) has an inductance of about 12 nH.

In another example embodiment, the transceivers are configured to time-multiplex the near-field signals with the far-field signals.

In another example embodiment, the transceivers are configured to alternately turned on and off to time-multiplex the near-field signals with the far-field signals.

In another example embodiment, further comprising a second filter coupled between the first conductive antenna surface and the far-field transceiver; wherein the second filter is configured to attenuate near-field signals passing between the first conductive antenna surface and the near-field transceiver from being received by the far-field transceiver; and wherein the second filter is configured to pass far-field signals between the far-field transceiver and the first conductive antenna surface.

In another example embodiment, further comprising a reference plane; wherein the reference plane is coupled to the far-field transceiver; wherein the reference plane is configured to be located closer to the conductive host surface than the first conductive antenna surface.

In another example embodiment, the conductive host surface is at least one of: a human body, an ear, a wrist, or an orifice.

In another example embodiment, the combination antenna is embedded in an earbud and the first conductive antenna surface forms an outside surface of the earbud.

In another example embodiment, further comprising a second conductive antenna surface coupled to the near-field transceiver; and wherein the first conductive antenna surface is further from the conductive host structure than the second conductive antenna surface.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
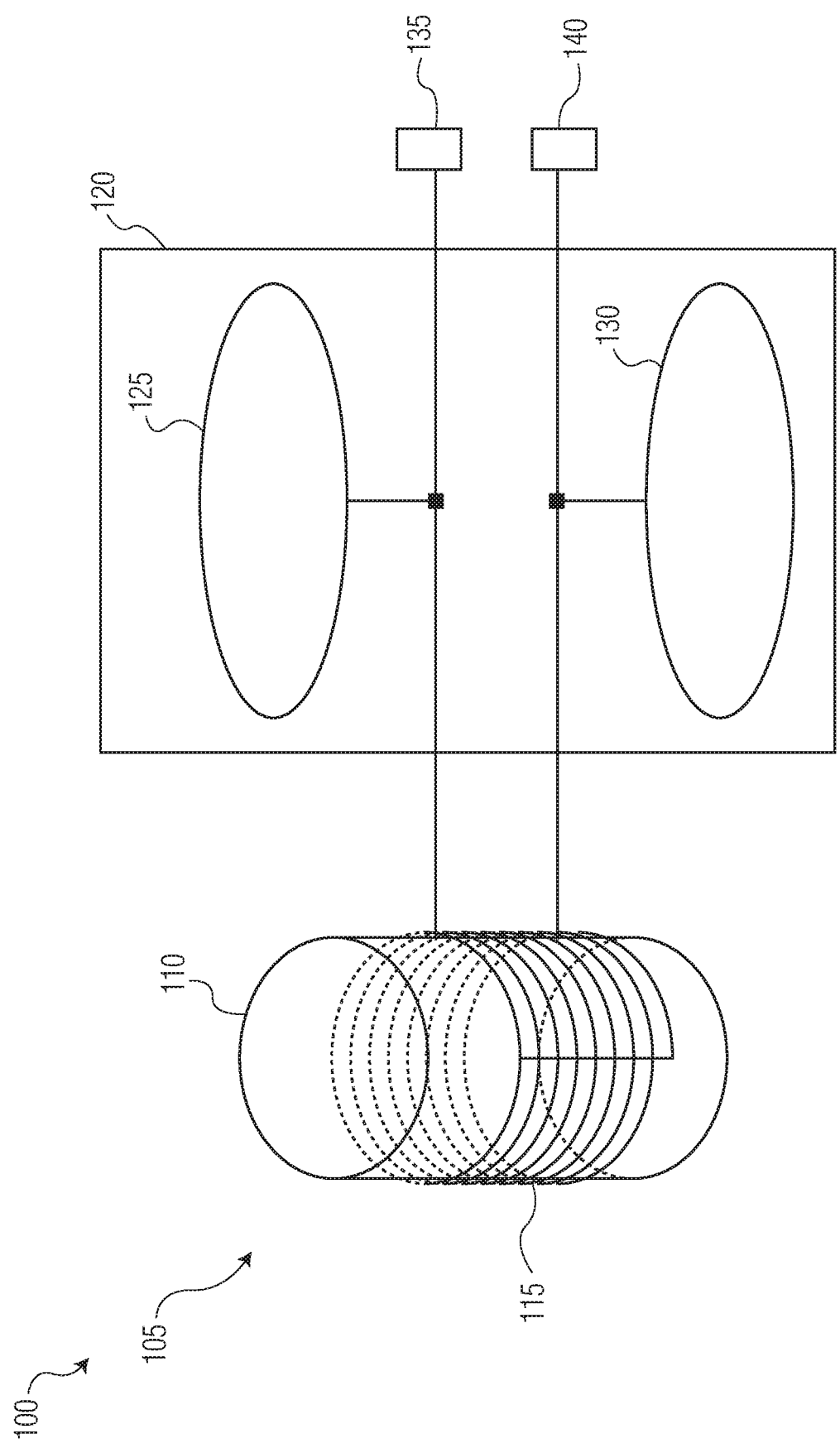
FIG. 1 is an example near-field electromagnetic induction (NFEMI) antenna.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Herein discussed are on-body and off-body communication and other wireless networked devices based on near-field electromagnetic induction (NFEMI), where the transmitter and receiver are coupled by both magnetic (H) and electric (E) fields and/or far-field communication using RF plane waves propagating through free space.

On-body NFEMI communications utilize non-propagating quasi-static H and E fields. Such on-body NFEMI devices include an H-field antenna (i.e. magnetic antenna) that is primarily sensitive to magnetic fields and/or primarily initiates magnetic fields when driven by a current. Any E-field component from an H-field antenna is strongly reduced (e.g. −20 to −60 dB reduction, a factor of 0.1 to 0.0008 (10% to 0.08%) depending on the antenna design).

A small loop antenna is an example H-field antenna and includes a loop antenna with dimensions much smaller than the wavelength of its use. The small loop antenna does not resonate at the NFEMI carrier frequency but is instead tuned to resonance by an external reactance. In some example embodiments the current in the small loop antenna has in every position of the loop the same value.

Such on-body NFEMI devices also include an E-field antenna (i.e. electric antenna) that is primarily sensitive to electric fields and/or primarily initiates electric fields when driven by a voltage. Any H-field component from an E-field antenna is strongly reduced (e.g. −20 to −60 dB reduction, a factor of 0.1 to 0.0008 (10% to 0.08%) depending on the antenna design).

A short loaded dipole antenna is an example E-field antenna and includes a short dipole with dimensions much smaller than the NFEMI carrier frequency and in some example embodiments has extra capacitance structures at both ends.

The quasi-static characteristic of these near-fields is a result of the NFEMI antenna dimensions in combination with their carrier frequencies. Most of the near-field energy is stored in the form of magnetic and electric fields, while a small amount of RF energy inevitably propagates in free space.

Near-field magnetic induction (NFMI) or near-field electric induction (NFEI) communication may also be used for such body communications. The magnetic fields in NFMI devices are not coupled to the body, and thus such devices can be farther away from the body than NFEMI or NFEI devices and still ensure communication. The NFMI device's range however is much shorter than a full body NFEI device's range due to small magnetic antenna sizes in such NFMI devices. Small antenna geometries are efficient for NFMI and NFEMI antennas since they minimize radiating waves in free space.

FIG. 1 is an example near-field electromagnetic induction (NFEMI) antenna 100 for use in a wireless device. The antenna 100 in this example is an electromagnetic induction (NFEMI) antenna. In some example embodiments, the antenna 100 includes a coil antenna 105 (i.e. for magnetic fields) in conjunction with a short loaded dipole 120 (i.e. for electric fields). The coil antenna 105 includes a ferrite core 110 wound with wire 115. The short dipole 120 include a first conductive antenna surface 125 and a second conductive antenna surface 130. Antenna 100 feed points 135, 140 are coupled to various transceiver circuitry, such as downstream radio transmitter and receiver integrated circuit (RF-IC), (not shown here). The antenna 100 bandwidth and resonance frequency can be tuned using reactance components (e.g. capacitive and resistive banks) that are integrated in the radio IC.

The short loaded dipole portion 120 is responsive to an electric (E) field. The coil antenna portion 105 is responsive to a magnetic (H) field.

When the NFEMI antenna 100 is proximate to a body (e.g. a person, an object, etc.) the magnetic and electric fields will be substantially confined to the body and not significantly radiate in free-space. This enhances security and privacy of such body networked communications.

In various example embodiments, the antenna 100 operates at or below 50 MHz to ensure that the fields are following the body contours and to ensure that far field radiation is strongly reduced.

Some body-wearable devices such as smart-watches contain a far-field communication module to communicate off-body with other wireless devices as for example a smart phone.

The body-wearable devices may also contain a near-field communication module that is part of a body area network that may include earbuds and various sensors configured to be placed close to a user's body. Such sensors may collect body parameters which are transmitted by near-fields to the smart-watch even while a user is listening to music streamed from the smartphone to the smart-watch and then to the earbuds.

However, in some body area network applications, a user may not be fitted with a smart-watch or smart-wristband. In such cases another body-wearable device will need to include a far-field communication module to wirelessly communicate with the smartphone and/or other off-body devices. Including the far-field communication module in an earbud could be problematic since the formfactor for earbuds is preferably very small.

Now discussed are example embodiments of body-wearable devices that combine near-field and far-field antennas. Such a combination antenna reuses parts of the near-field antenna for far-field communications such that either no or minimal extra volume is required so that both antennas fit into the formfactor of a small earbud.

Example embodiments of such a combination/dual-mode antenna, can include a first mode for near-field audio and data communication and a second mode for far-field communication (e.g. Bluetooth, BLE, etc.). Such a combination antenna permits both on-body and off-body wireless communication of audio, video, and data.

Figure 2:
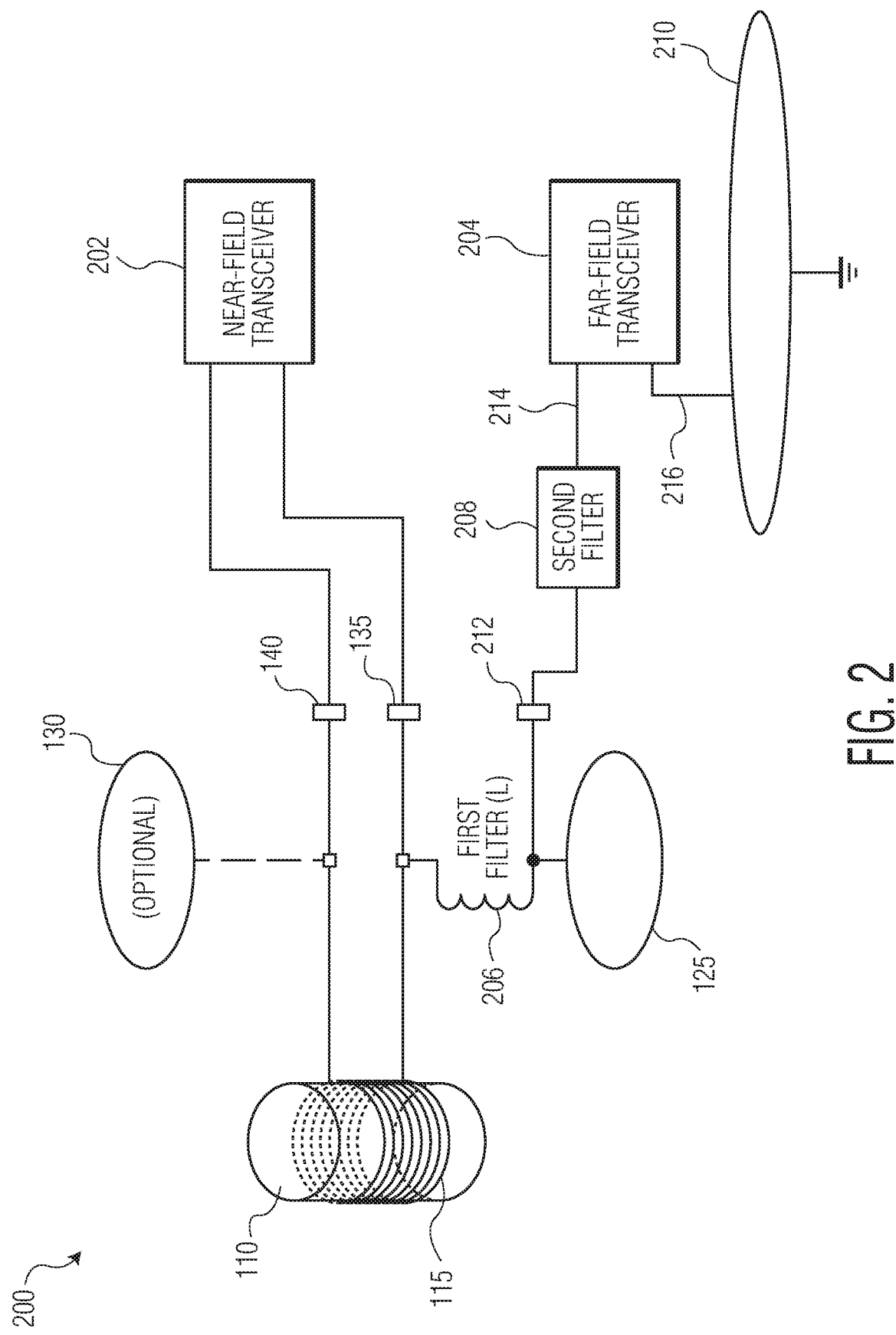
FIG. 2 is an example combination near-field and far-field antenna.

FIG. 2 is an example 200 combination near-field and far-field antenna. The combination antenna 200 includes the elements of the NFEMI antenna 100 (i.e. the ferrite core 110 wrapped by the wire 115 to form the near-field magnetic antenna, and the first 125 and second 130 conductive antenna surfaces to form the near-field electric antenna).

The feed points 135, 140 are coupled to a near-field transceiver 202 that in various example embodiments includes a radio transmitter and receiver integrated circuit (RF-IC) and various reactance components (e.g. capacitive and resistive banks) for adjusting the NFEMI antenna 100 bandwidth and resonance frequency.

The example 200 combination near-field and far-field antenna also includes a far-field transceiver 204, a first filter (L) 206 (e.g. RF choke coil or a combination of coils and capacitors), a second filter 208, a reference plane 210, and feed points 212, 214, 216.

The first conductive antenna surface 125 functions as both a near-field E-field coupling and as a far-field coupling for RF plane waves propagating through free space. The first conductive antenna surface 125 in various example embodiments can be a planar plate, a planar coil, a spiral coil, or a helical coil.

In some example embodiments, this dual-use first conductive antenna surface 125 is as far as possible from a first conductive structure (e.g. a user's skin) thereby improving near-field electric (E-field) performance while simultaneously reducing far-field RF signal absorption by the user's body. The first conductive antenna surface 125 can in some examples also be oriented such that far-field antenna currents are substantially perpendicular to a conductive host surface (e.g. a user's head).

A first interface of the first filter 206 is coupled to both the first conductive antenna surface 125 and feed point 212 from the far-field transceiver 204, while a second interface of the first filter (L) 206 is coupled to the feed point 135.

In the near-field mode at lower frequencies (e.g. 10 MHz), the first filter (L) 206 is a low impedance and the near-field transceiver 202 electrically "sees" only the coil antenna portion 105 (small loop antenna, H-field) and the short loaded dipole portion 120 (i.e. electric (E) field) as described in FIG. 1. The second filter 208 is configured to attenuate near-field transceiver 202 signals from the far-field transceiver 204.

In the far-field mode at higher frequencies (e.g. 2.4 GHz), the first filter (L) 206 is a high impedance and the far-field transceiver 204 electrically "sees" only the first conductive antenna surface 125 and prevents far-field signals from leaking into the near-field transceiver 202.

In some example embodiments, the first filter (L) 206 has an inductance of about 12 nH for a dual mode system where 10.6 MHz is used for the near-field communication frequency and 2.5 GHz (e.g. BT or BLE) for the far-field communication frequency.

The first filter (L) 206 can be a plain inductive coil, a ferrite bead, a coil with ferrite material around, a "parallel circuit" tuned to RF frequency. The first filter (L) 206 can have either a low-pass filter or a notch filter configuration.

The second filter 208 (e.g. including RF matching and near-field filtering circuits) is coupled between feed point 212 and the far-field transceiver 204 by feed point 214. The second filter 208 further isolates the far-field transceiver 204 from near-field transceiver 202 near-field signals. The second filter 208 can have either a high-pass filter or a notch filter configuration.

In example embodiments where the far-field transceiver 204 has a balanced input/output, a balanced unit (BALUN) is inserted between the far-field transceiver 204 and the second filter 208.

In some example embodiments, the second filter 208 can be deleted if near-field and far-field communications are time multiplexed (i.e. do not occur at a same time). Various shielding could be instead added to suppress any signal harmonic interference between the two transceivers 202, 204. The transceivers 202, 204 could be alternately turned on and off as well to prevent interference.

The far-field transceiver 204 is coupled to the reference plane 210 (e.g. of a printed circuit board) by feed point 216. The reference plane 210 in some example embodiments is in a location shielded from far-field interference (e.g. for an earbud device the reference plane 210 could be located far into the inner-ear canal).

The reference plane 210 is in some examples placed at a greatest distance from the first conductive antenna surface 125 to minimize any capacitance between the reference plane 210 and the first conductive antenna surface 125. Also a dielectric material (e.g. PCB, plastic with a low-dielectric constant, an air cavity, etc.) could be placed between the first surface 125 and the reference plane 210.

FIGS. 3A, 3B, 3C and 3D show two example wireless devices 300, 326 that include the example combination antenna. In this example embodiment, the wireless devices 300, 326 are earbuds that in use may be partially or completely covered, such as when in an earbud placed in a user's ear canal.

Figure 3B:
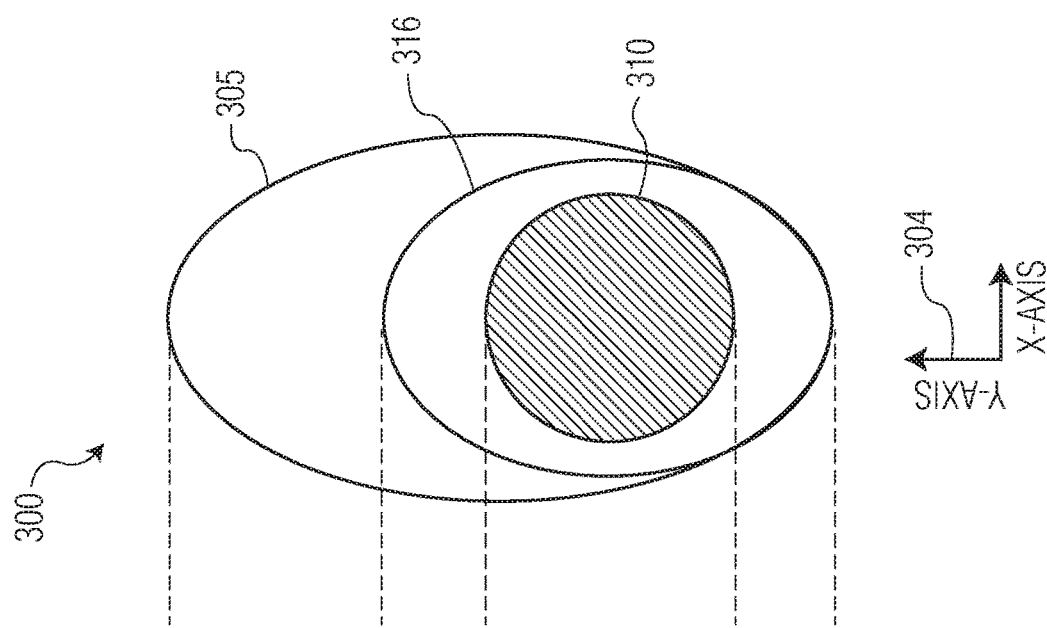
FIGS. 3A, 3B, 3C and 3D show two example wireless devices that include the example combination antenna.
Figure 3A:
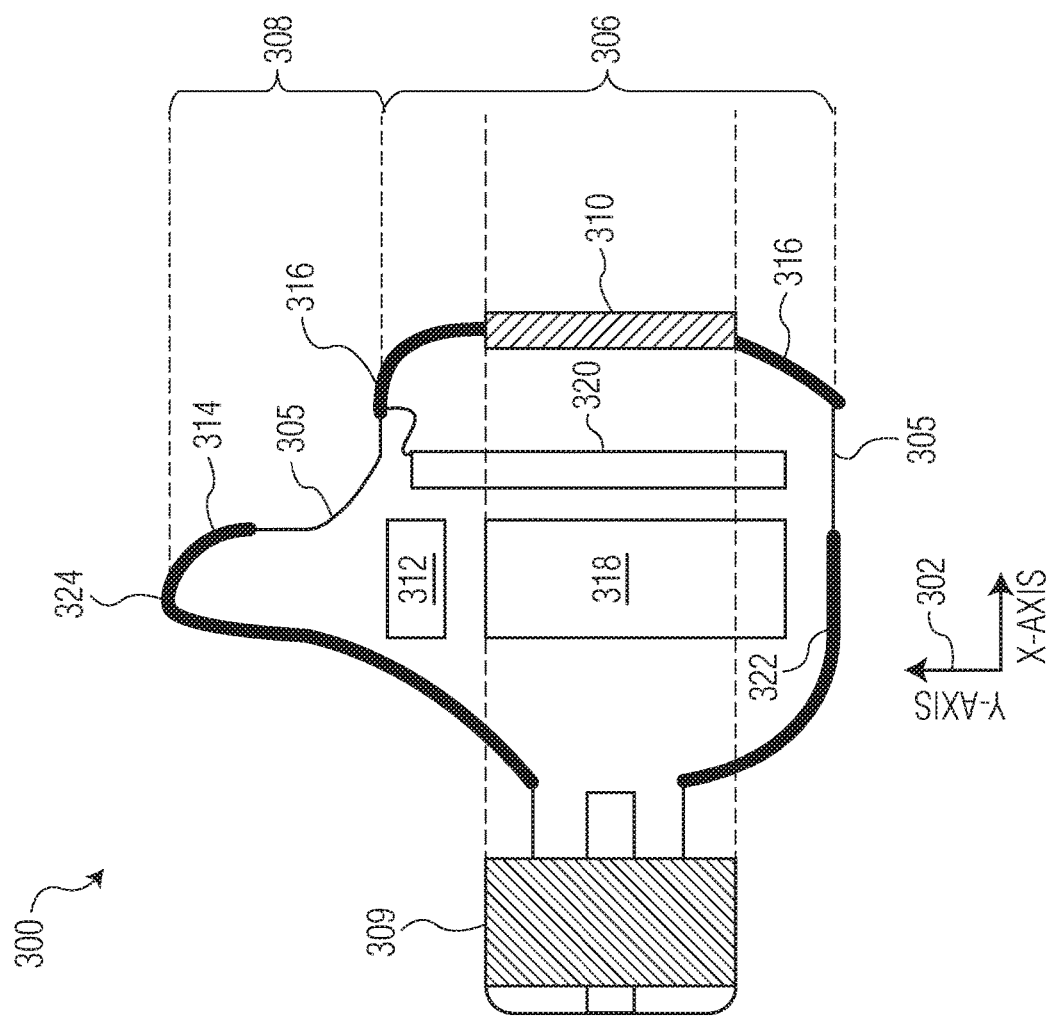

FIG. 3A is an example side view 302 of the first wireless device 300 having a continuous first conductive antenna surface 316 and FIG. 3B is an example axial view 304 (i.e. facing a side opposite to an ear canal) of the first wireless device 300 having a continuous first conductive antenna surface 316.

The device 300 includes a non-planar outer surface 305 having a core region 306 and an extension region 308, a loudspeaker 309, a user interface 310, a coil antenna 312 (i.e. magnetic H-Field antenna), a second conductive antenna surface 314 (i.e. electric E-Field antenna), the first conductive antenna surface 316 (i.e. electric E-Field antenna), a battery 318 and electronic circuitry 320 including a carrier (e.g. pc-board).

The core region 306 is this example houses various functional components as shown in FIGS. 2 and 3A. The extension region 308 defines part of the non-planar outer surface 305 of the wireless device 300 and is contoured to snugly fit the non-planar surface of a host conductive surface (e.g. a user's ear, so as to provide a stable positioning of an earbud embodiment of the wireless device 300).

In some example embodiments, the loudspeaker 309 is configured to be inserted in a user's ear canal. The user interface 310 enables control of the wireless device 300 (e.g. controlling different functionalities of the earbud) and may include switches, proximity, and/or optoelectronics responsive to touch and/or gestures from a user.

Some example embodiments of the coil antenna 312 include a core and wire windings, where the core is a ferrite material with dimensions of 2 mm diameter and 6 mm length) and there are at least 20 wire windings.

In some example embodiments, the second conductive antenna surface 314 includes a lower portion 322 inside of the wireless device 300 near the battery and an upper portion 324 that is closer to the outer surface of the wireless device 300. The first conductive antenna surface 316 in some examples encircles the user interface 310, while in other examples may have planar portions that continues on behind or in front of the user interface 310.

In some example embodiments the first and second conductive antenna surfaces 314, 316 are flexible metal foils, in other example embodiments the first and second conductive antenna surfaces 316, 314 are conductive paints.

The battery 318 supplies power to the electronic circuitry 320, and may be chargeable or replaceable. The electronic circuitry 320 in various example embodiments includes transceiver circuitry, a receiver integrated circuit (RF-IC), and reactance components (e.g. capacitive and resistive banks). The reactance components (e.g. capacitive and resistive banks) adjust a bandwidth and resonance frequency of the device 300. The electronic circuitry 320 may be coupled to a substrate/carrier. The carrier may be a printed circuit board or any flexible material suitable to hold the electronic circuitry 320 and any mechanic components enabling the functioning of the earbud.

Figure 3D:
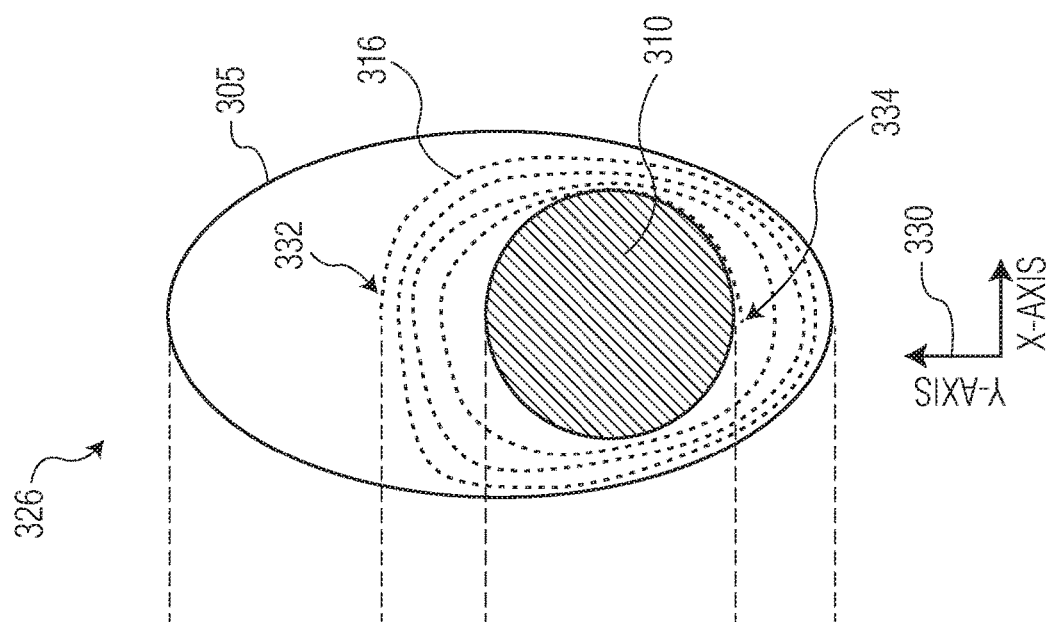
Figure 3C:
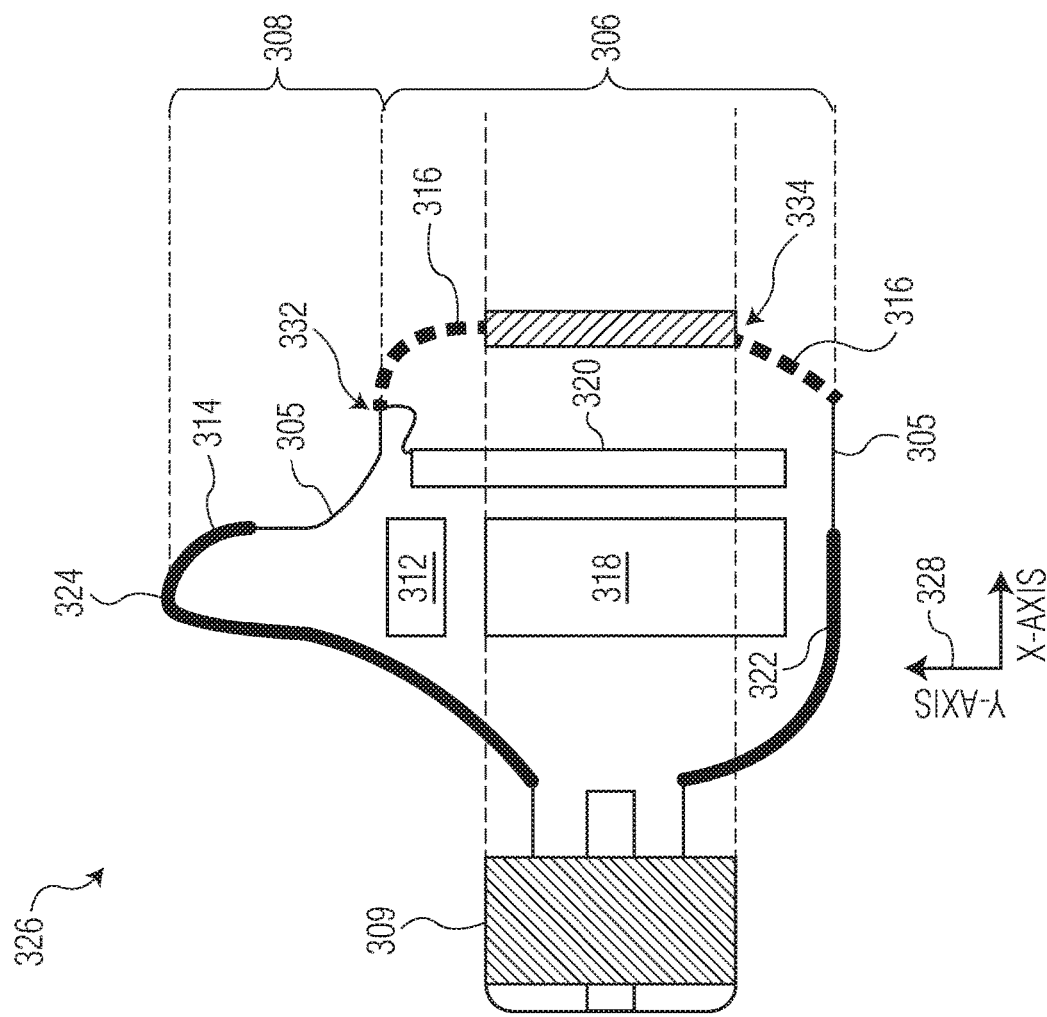

FIG. 3C is an example side view 328 of the second wireless device 326 having a spiral/helical first conductive antenna surface 316 and FIG. 3D is an example axial view 330 (i.e. facing a side opposite to an ear canal) of the second wireless device 326 having the spiral/helical first conductive antenna surface 316.

In the example second wireless device 326, the first conductive antenna surface 316 is a planar spiral or non-planar helical structure having a first end 332 coupled to the electronic circuitry 320 (or the coil antenna 312) and a second end 334 un-coupled and terminating in free-space there by forming a monopole RF antenna. The spiral/helical shape can be implemented inside a plastic housing of an earbud. A distance between the first end 332 and the second end 334 is selected in some example embodiments to have sufficient length to resonate far-field communication frequencies between 1 and 6 GHz.

Other special shapes of the first conductive antenna surface 316 are also possible. In the helical embodiment, the first conductive antenna surface 316 can begin to spiral out from near a user's head in various directions. The helical wire can be very thin to create a very long far-field monopole antenna for more robust far-field communication. More than one such helical wire can also be used either in a nested configuration or in different geometric planes.

In the near-field mode, a voltage transmitted and/or received by the NFEMI antenna of the wireless device 300 is a combination of voltages due to both the magnetic H-Field and the electric E-Field.

By geometrically conforming the second conductive antenna surface 314 to a host surface (e.g. a user's ear canal), the antenna capacitance (Ca) is increased. Thus the shape of the extension region 308 by conforming to a user's outer ear and the shape of the portion of the core region 306 next to the loudspeaker 309 conforming to a user's inner ear, increases the NFEMI antenna's capacitance (Ca) and a larger electrical field is generated.

So even though direct E-Field generation by the second conductive antenna surface 314 is blocked by the inner ear, the larger capacitance (Ca) enables the host conductive surface (e.g. a user's body) to indirectly transmit the second conductive antenna surface's 314 E-Field.

Also, in the near-field mode, by maximizing the distance (d) between the second conductive antenna surface 314 and the first conductive antenna surface 316, a larger electrical field is generated and received voltage (Vrx) further increases.

Using both of these techniques, a robustness of near-field mode NFEMI communications is achieved.

In the far-field mode, the three-dimensional-helical winding, or planar-spiral winding of the first conductive antenna surface 316 creates a long (e.g. equal or greater than ¼ wavelength) RF antenna for enhanced far-field radiation.

The electric vector created by the windings 316 has the same orientation as the orientation of the current flow through the windings 316. When the first conductive antenna surface 316 is positioned perpendicular to the skin of the head (which is the case for an earbud) the current flow has an orientation perpendicular to the skin. The currents which are parallel to the skin are cancelling each other since the current in front of the coil is 180 degrees out of phase with the current in back of the coil.

The gain of the antenna in some example embodiments is between −15 and −5 dBi at 2.5 GHz. This is due to a low radiation resistance (1 to 5 ohms) and low absorption of by for example, a human tissue conductive host surface. However for a 0 dBm transmitter output this is sufficient for a communication range of 10 to 15 meters if you have a sensitive receiver (for example −92 dBm).

Figure 4:
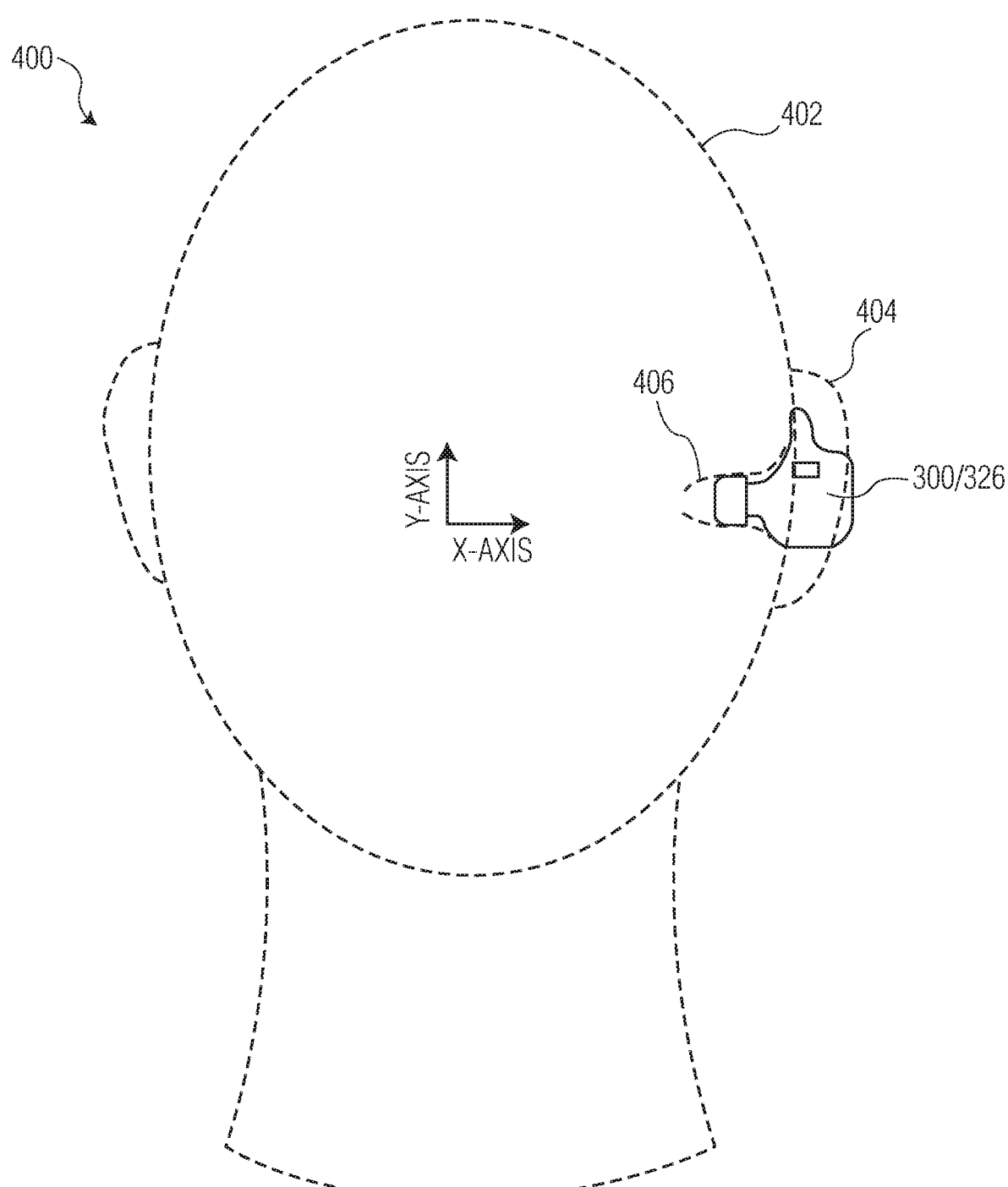
FIG. 4 is an example pictorial diagram of the example combination near-field and far-field antenna is either the first or second wireless device positioned in a user's ear.

FIG. 4 is an example 400 pictorial diagram of the example combination near-field and far-field antenna 200 in either the first or second wireless device 300, 326 positioned proximate to a first conductive host surface 402 (e.g. a user's head), a second conductive host surface 404 (e.g. a user's outer-ear) and/or a third conductive host surface 406 (e.g. a user's inner-ear).

In one example embodiment, the loudspeaker 309 is inserted in the user's 402 inner-ear canal 406 and the first conductive structure 314 is fitted proximate to both the inner-ear 406 and outer-ear 404 canals, while the second conductive structure 316 is positioned separated away from the inner ear. This configuration of the conductive structures 314, 316 provides a combination of close skin contact with the host and a maximum separation between the two conductive structures 314, 316.

The conductive host surfaces 402, 404, 406 can be more generally any E-field responsive conductive host surface. Such conductive host surfaces 402, 404, 406 in various other example embodiments can be another part of a human body, a body surface, an orifice, a nose, a mouth, or a conductive structure of any type.

Near-field signals from the combination antenna 200 are confined near the conductive host surfaces 402, 404, 406 in transmit mode, and confined by the conductive host surfaces 402, 404, 406 in receive mode.

In example embodiments of the near-field mode, the near-field frequencies are kept below 50 MHz to ensure that the near-field signals follow the conductive host surface's 402, 404, 406 contours and only a little far field radiation is radiated from the first conductive antenna surface 316. However, in the far-field mode, the first conductive antenna surface 316 is configured to radiate significant far-field radiation.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transient computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transient machine or computer-usable media or mediums as defined herein excludes signals, but such media or mediums may be capable of receiving and processing information from signals and/or other transient mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A combination near-field and far-field antenna configured to be coupled to a conductive host surface, comprising:
   a first feed point configured to be coupled to a far-field transceiver;
   a second feed point configured to be coupled to a near-field transceiver;
   a first conductive antenna surface;
   a first filter having a first interface coupled to both the first feed point and the first conductive antenna surface, and having a second interface coupled to the second feed point;
   wherein the first filter is configured to attenuate far-field signals passing between the first conductive antenna surface and the far-field transceiver from being received by the near-field transceiver; and
   wherein the first filter is configured to pass near-field signals between the near-field transceiver and the first conductive antenna surface.

2. The combination near-field and far-field antenna of claim 1:
   wherein the first conductive antenna surface is a planar plate.

3. The combination near-field and far-field antenna of claim 1:
   wherein the first conductive antenna surface is either a planar spiral coil or non-planar helical coil.

4. The combination near-field and far-field antenna of claim 1:
   wherein the first conductive antenna surface is either a planar spiral or non-planar helical structure having a first end coupled to a set of electronic circuitry and a second end un-coupled and terminating in free-space.

5. The combination near-field and far-field antenna of claim 4:
   wherein the first conductive antenna surface is a monopole far-field antenna.

6. The combination near-field and far-field antenna of claim 5:
   wherein the monopole far-field antenna has a length greater than or equal to ¼ wavelength of the far-field signals carrier frequency.

7. The combination near-field and far-field antenna of claim 1:
   wherein the first conductive antenna surface is oriented such that far-field signal currents are substantially perpendicular to the conductive host surface.

8. The combination near-field and far-field antenna of claim 1:
   further comprising a coil antenna portion coupled to the near-field transceiver and configured as a near-field magnetic antenna.

9. The combination near-field and far-field antenna of claim 1:
   wherein the near-field signals are about 50 MHz or less; and
   wherein the far-field signals are about 1 GHz or more.

10. The combination near-field and far-field antenna of claim 1:
    wherein the first filter is an RF choke coil.

11. The combination near-field and far-field antenna of claim 1:
    wherein the first filter is at least one of: a ferrite bead, a coil with ferrite material around, or a parallel circuit tuned to RF frequency.

12. The combination near-field and far-field antenna of claim 1:
    wherein the first filter has either a low-pass filter topology or a notch filter topology.

13. The combination near-field and far-field antenna of claim 1:
    wherein the first filter (L) has an inductance of about 12 nH.

14. The combination near-field and far-field antenna of claim 1:
    wherein the transceivers are configured to time-multiplex the near-field signals with the far-field signals.

15. The combination near-field and far-field antenna of claim 1:
    wherein the transceivers are configured to alternately turned on and off to time-multiplex the near-field signals with the far-field signals.

16. The combination near-field and far-field antenna of claim 1:
    further comprising a second filter coupled between the first conductive antenna surface and the far-field transceiver;
    wherein the second filter is configured to attenuate near-field signals passing between the first conductive antenna surface and the near-field transceiver from being received by the far-field transceiver; and
    wherein the second filter is configured to pass far-field signals between the far-field transceiver and the first conductive antenna surface.

17. The combination near-field and far-field antenna of claim 1:
    further comprising a reference plane;
    wherein the reference plane is coupled to the far-field transceiver;

wherein the reference plane is configured to be located closer to the conductive host surface than the first conductive antenna surface.

18. The combination near-field and far-field antenna of claim 1:
wherein the conductive host surface is at least one of: a human body, an ear, a wrist, or an orifice.

19. The combination near-field and far-field antenna of claim 1:
wherein the combination antenna is embedded in an earbud and the first conductive antenna surface forms an outside surface of the earbud.

20. The combination near-field and far-field antenna of claim 1:
further comprising a second conductive antenna surface coupled to the near-field transceiver; and
wherein the first conductive antenna surface is further from the conductive host structure than the second conductive antenna surface.

* * * * *